United States Patent
Strayer et al.

(10) Patent No.: US 9,571,463 B2
(45) Date of Patent: Feb. 14, 2017

(54) POLICY-BASED ACCESS CONTROL IN CONTENT NETWORKS

(71) Applicant: Raytheon BBN Technologies Corp., Cambridge, MA (US)

(72) Inventors: William Timothy Strayer, West Newton, MA (US); Joud Khoury, Boston, MA (US); Armando Luis Caro, Jr., Somerville, MA (US); Vikas Kawadia, Winchester, MA (US); Samuel Cunningham Nelson, V, Wakefield, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 394 days.

(21) Appl. No.: 14/330,543

(22) Filed: Jul. 14, 2014

(65) Prior Publication Data
US 2016/0014095 A1     Jan. 14, 2016

(51) Int. Cl.
*G06F 7/04*     (2006.01)
*H04L 29/06*     (2006.01)
*H04L 9/08*     (2006.01)

(52) U.S. Cl.
CPC ........... *H04L 63/0428* (2013.01); *H04L 9/088* (2013.01); *H04L 63/20* (2013.01)

(58) Field of Classification Search
USPC ....................................................... 726/27, 1
See application file for complete search history.

(56) References Cited

U.S. PATENT DOCUMENTS

| | | | | |
|---|---|---|---|---|
| 7,757,101 B2* | 7/2010 | Nonaka | .................. | G06F 21/10 705/51 |
| 7,853,783 B2* | 12/2010 | Bin | ..................... | H04L 63/0272 713/153 |
| 8,364,984 B2* | 1/2013 | Jeffries | ............... | G06F 21/6209 709/229 |
| 8,396,838 B2* | 3/2013 | Brockway | ......... | G06F 17/30616 707/662 |

(Continued)

OTHER PUBLICATIONS

"Crypto SDK for easily implementing cryptography into your applications", [online]. CertiVox Ltd. [retrieved on Feb. 9, 2015]. Retrieved from the Internet: <URL: 5. Crypto SDK for easily implementing cryptography into your applications.htm>, (2015), 9 pgs.

(Continued)

*Primary Examiner* — Amare F Tabor
(74) *Attorney, Agent, or Firm* — Schwegman Lundberg & Woessner, P.A.

(57) ABSTRACT

Systems and techniques for policy-based access control in content networks are herein described. Content and metadata describing the content may be encrypted by using an access control policy and a cryptographic key associated with the access control policy. The access control policy may be defined with a set of access control attributes. Each node in the content-based network may be assigned a set of access control attributes and a cryptographic key generated as a function of its assigned set of access control attributes. Each node in the content-based network may be configured to decrypt successfully the metadata or the content if and only if the assigned set of access control attributes of the node satisfies the access control policy used to encrypt the metadata or content.

18 Claims, 8 Drawing Sheets

(56) References Cited

U.S. PATENT DOCUMENTS

| | | | | |
|---|---|---|---|---|
| 8,843,997 | B1* | 9/2014 | Hare | H04L 63/0281 709/200 |
| 8,990,559 | B2* | 3/2015 | Hajost | H04L 63/20 380/270 |
| 9,111,105 | B2* | 8/2015 | Barton | H04L 41/00 |
| 9,141,815 | B2* | 9/2015 | Burchett | G06F 21/602 |
| 9,152,793 | B2* | 10/2015 | Futral | G06F 21/572 |
| 9,288,234 | B2* | 3/2016 | Barr | H04L 63/205 |
| 2015/0150073 | A1* | 5/2015 | Bhalerao | H04L 63/20 726/1 |
| 2015/0347773 | A1* | 12/2015 | Bonney | G06F 21/6218 726/1 |

OTHER PUBLICATIONS

Akinyele, Joseph A. et al., "Self-Protecting Electronic Medical Records Using Attribute-Based Encryption", *IACR Cryptology ePrint Archive: Report 2010/565*, (2010), 1-20.

Barreto, Paulo S.L.M., et al,, "Pairing-Friendly Elliptic Curves of Prime Order", *SAC 2005, LNCS 3897*, Preneel B., (Eds.), (2006), 319-331.

Bethencourt, John, et al,, "Ciphertext-policy attribute-based encryption", *2007 IEEE Symposium on Security and Privacy (SP'07)*, (2007), 14 pgs.

Boneh, Dan, et al., "Functional Encryption a New Vision for Public Key Cryptography", *Communications of the ACM*, 55(11), (Nov. 2012), 8 pgs.

Galbraith, Steven D., et al., "Pairings for Cryptographers", *IACR Cryptology ePrint Archive Report 2006/165*, (May 2006), 1-11.

Granger, Robert, "On Computing Products of Pairings", *IACR Cryptology ePrint Archive Jan. 2006*, (2006), 11 pgs.

Hur, Junebeom, et al., "Secure Data Retrieval for Decentralized Disruption-Tolerant Military Networks", *IEEE Transactions on Networking*, 22(1), (2014), 11 pgs,.

Ion, Mihaela, et al., "Toward Content-Centric Privacy in ICN: Attribute-based Encryption and Routing", *SIGCOMM '13*, Aug. 12-15, 2013, Hong Kong, China, (2013), 513-514.

Khoury, John, et al., "Efficient Private Publish-Subscribe Systems", *2014 IEEE 17th International Symposium on Distributed Computing (ISORC)*, (2014), 92 pgs.

Khoury, Joud, et al., "An Efficient and Expressive Access Control Architecture for Content-based Networks", *2014 IEEE Military Communications Conference (MILCOM)*, (2014), 6 pgs.

Liu, Zhen, et al., "On Efficiently Transferring the Linear Secret-Sharing Scheme Matrix in Ciphertext-Policy Attribute-Based Encryption", *IACR Cryptology ePrint Archive*, 374, (2010), 17 pgs.

Menezes, Alfred J., *Handbook of Applied Crytography*, CRC Press, (1996), 794 pgs.

Ruj, Sushmita, et al., "Improved Access Control Mechanism in Vehicular Ad Hoc Networks", *ADHOC-NOW 2011, LNCS 6811*, Frey, H., et al., (Eds.), 191-205.

Strayer, Tim, et al., "CASCADE: Content Access System for the Combat-Agile Distributed Environment", *2013 IEEE Militar Communications Conference*, (2013), 1518-1523.

Waters, Brent, "Ciphertext-Policy Attribute-Based Encryption: An Expressive, Efficient, and Provably Secure Realization", *PKC 2011, LNCS 6571*, Catalano, D., et al. (Eds.), (2011), 53-70.

* cited by examiner

POLICY-BASED ACCESS CONTROL IN CONTENT NETWORKS

GOVERNMENT RIGHTS

This invention was made with support from the government of the United States of America; the government has certain rights in this invention.

TECHNICAL FIELD

Embodiments generally relate to securing content and metadata using policy-based access controls in content-based networks.

BACKGROUND

Content-based networking is an emerging technology; because of its youth, little thought has been given to its security. Content-based networking achieves efficiency via reuse, i.e., multiple nodes requesting the same content, whereas most security mechanisms work by restricting access based on possession of some secret. There is a fundamental tension between reuse and restriction, making it non-trivial to design a security solution for content-based networks without compromising efficiency. Further, since content-based networking uses content descriptions (e.g., metadata) rather than node identifiers as the way to move data around a network, traditional encryption and access control techniques are difficult to apply.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

A content-centric (or "content-based") network provides efficient extensible information exchange between nodes that produce content (publishers) and those that consume content (subscribers). In some content-based networks, a node is both a publisher node and a subscriber node. Publisher nodes describe content using metadata. Similarly, subscriber nodes query or register subscriptions for content and the content system delivers content to matching subscribers (queries or subscriptions). Content-based networks have several benefits, including (1) decoupled, automatic discovery of content, (2) efficient, interest-based delivery of information, and (3) simplified configuration, especially under dynamic conditions.

Two premises of traditional security mechanisms make them inappropriate for content-based networking. The first premise is that access to encrypted data is an "all or nothing" operation, in the sense that decryption reveals the entire plaintext or nothing at all. The second premise is that encryption is a way to transform the data so a single secret key can encode the data. These premises may be acceptable for the host-centric, point-to-point nature of traditional networking, but are fundamentally incompatible with content-based networking.

For example, a naïve solution is to encrypt both the content and the content's metadata with the same key; the result being that only those nodes that have the appropriate key can read the content and its metadata. Since metadata could reveal some aspect of the content itself, it is important that only those with the key to the content be able to read the metadata. In traditional encryption and access control techniques, the advantages of content-based networking diminish once metadata is encrypted because encryption prevents complex reasoning on that which is encrypted. In such scenarios, a request for encrypted content must be made with an exact match on the encrypted metadata; this is too restrictive for content-based networking.

Recent advances in cryptography have shown that security schemes may be designed that are not beholden to these premises of traditional security mechanisms. In a class of schemes called "functional encryption," upon decryption, a set of receivers (each with different private keys) are able to access some function of encrypted data, where the function is dictated by the receiver's key. In functional encryption, decryption yields a function $f(x)$ of the message x in plaintext.

Functional encryption encodes data in such a way that decryption provides access to a specific function of the encrypted data and nothing else. Specifically, a user in a functional encryption system associates a ciphertext descriptor when encrypting the data. Correspondingly, each user has a private key issued by a trusted authority that is associated with a key descriptor. A user with a private key descriptor, KD, can decrypt the data associated with a ciphertext descriptor CD if and only if a certain relation between KD and CD holds true. Note, that the encryption process only needs the public key of the trusted authority, and not of the potential receivers. This eliminates the need for public key directories and significantly reduces reliance on an expensive keying infrastructure.

Well-known instantiations of functional encryption include "identity-based encryption" and "attribute-based encryption" (ABE). In ABE, the key descriptor is a set of attributes that are true for a particular user and the ciphertext descriptor is a Boolean function over the set of all attributes. This Boolean function is also called the "policy". For example, a publisher could use attribute-based encryption to encode content for nodes whose squad is BLUE and whose expertise is HUMINT. Only nodes that have both these attributes would then be able to decrypt the data.

Tactical content-based networks provide high military utility in dynamic mobile networks with intermittent connectivity and inherent disruption. Protecting the confidentiality of information exchanges (e.g., content and metadata) in such networks is particularly challenging because the publisher of information does not know whom the subscribers are, yet the publisher wants fine-grained control over who has access to the information. Ciphertext Policy Attribute-Based Encryption (CP-ABE) is a widely accepted cryptographic solution to this 1-to-many access control problem. In CP-ABE, a publisher of information encrypts the information using a policy defined over a set of access control attributes. Only users with attributes (and respective cryptographic keys) that satisfy the policy are able to decrypt and access the information.

An important property of ABE systems is collusion resistance, e.g., a set of unauthorized users, who individually do not satisfy the policy but satisfy the policy jointly, are unable to decrypt the content by colluding. In other words, nodes gain no advantage by colluding to combine their attributes (e.g., two or more nodes are not able to combine their attributes to decrypt a ciphertext unless at least one of them is able to decrypt on its own.) Thus, nodes in the BLUE squad who do not have the authority to view sensitive HUMINT content cannot collude with HUMINT experts in the RED squad to decrypt the message.

ABE can be very powerful if applied correctly. A naïve solution using ABE uses the metadata as the content's attributes, thereby conflating metadata with policy. Such solutions expose all metadata to all nodes, which is not advisable in some embodiments because metadata describes content, and in such embodiments, the metadata needs to be restricted to certain nodes.

Furthermore, although problems with key revocation are not improved with ABE, ABE does not worsen them. In some military embodiments, keys will be issued for a mission and revoked when the mission is over, so there is a natural time limit to unauthorized exposure if a keyed device is lost.

Figure 1:
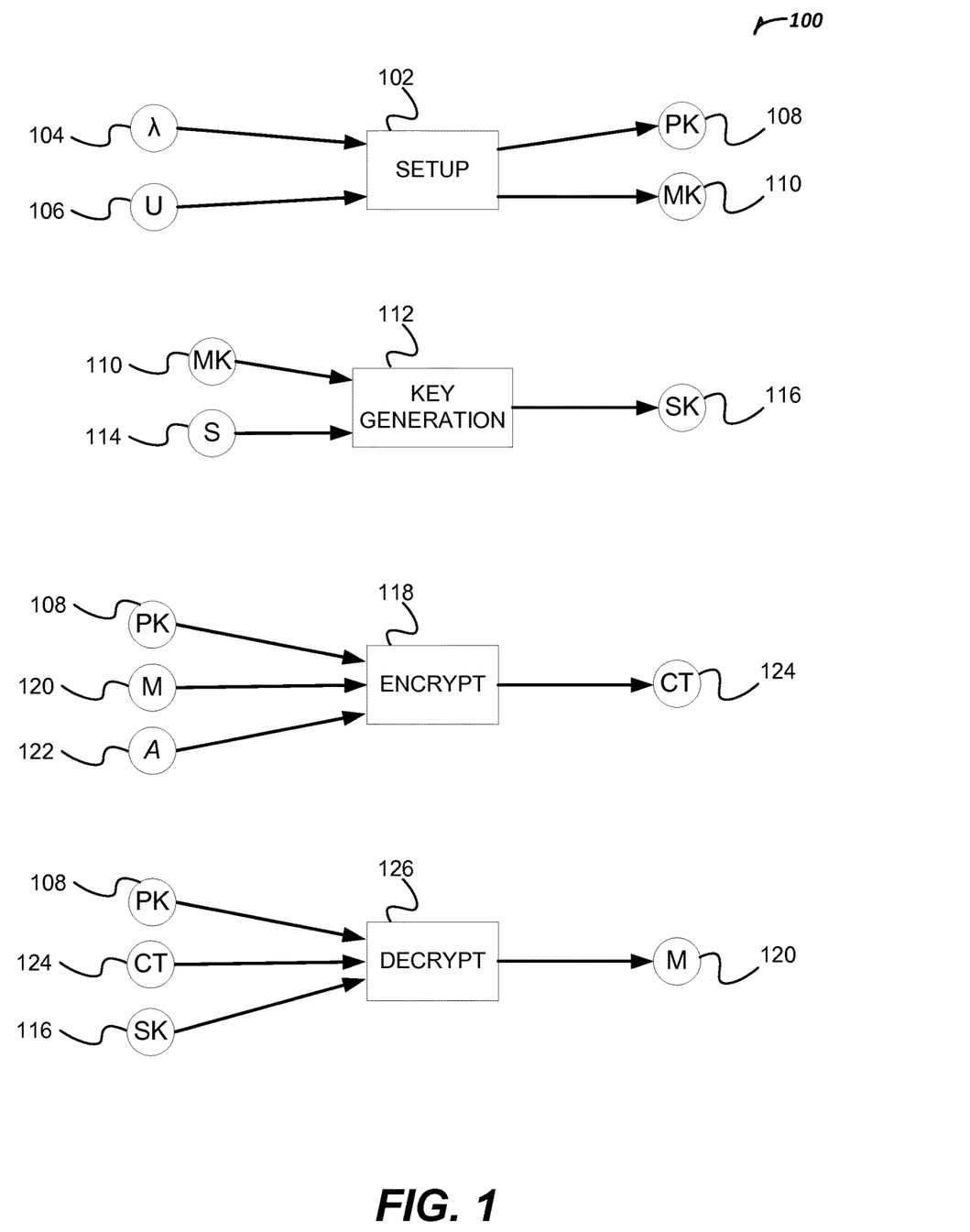
FIG. 1 illustrates a ciphertext-policy attribute-based encryption scheme, in accordance with some embodiments.

FIG. 1 illustrates a ciphertext-policy attribute-based encryption scheme 100, in accordance with some embodiments. The ciphertext-policy attribute-based encryption scheme 100 consists of four algorithms: Setup 102, Key Generation 112, Encrypt 118, and Decrypt 126.

The Setup algorithm 102 takes as inputs the security parameter $\lambda$ 104 and attribute universe $\cup$ 102, also referred to as the "alphabet". The Setup algorithm 102 outputs the public parameters PK 108 and a master key MK 110.

The Key Generation algorithm 112 takes as inputs the master key MK 110 and a set of attributes S 114 that describe master key MK 110. The Key Generation algorithm 112 outputs a private key SK 116, which can be used to decrypt any content encrypted with the set of attributes S 114.

In some embodiments, a trusted third party uses the Setup 102 and Key Generation 112 algorithms to assign to each respective node in the content-based network a respective set of access control attributes and a respective cryptographic key generated as a function of the assigned respective set of access control attributes.

The Encrypt algorithm 118 takes as inputs the public parameters PK 108, a message M 120 to encrypt, and access structure/policy A 122 over the attribute universe $\cup$ 102. The Encrypt algorithm 118 will encrypt M 120 and produce a ciphertext CT 124 such that only a user that possesses a set of attributes that satisfies the access structure/policy A 122 will be able to decrypt the message M 120. In some embodiments, the ciphertext CT 124 implicitly contains A 122 (e.g., the access structure/policy A 122 is not encrypted.)

In some embodiments, the access structure/policy A 122 is monotone. Policies, or access structures, are expressive and include one or more threshold gates including AND (n-of-n), OR (1-of-n) or threshold k-of-n gates. However, in a monotone policy, the NOT gate is not supported. For example, using the Key Generation algorithm 112, a subscriber is granted the following two attributes S={MARINE CORPS, SQUAD LEADER} to form the subscriber's private key SK 116. A publisher encrypts a content item using the Encrypt algorithm 118, with the following Boolean access structure/policy A 122 over the attributes: MARINE CORPS AND SQUAD LEADER. The subscriber is able to decrypt the ciphertext because the subscriber's attribute set S satisfies the access structure/policy A 122. In some embodiments, support for the Boolean function NOT is achieved by explicitly including an attribute (e.g., X) and its Boolean negative (e.g., $\neg$ X) in the attribute universe $\cup$ 102.

The Decrypt algorithm 126 takes as inputs the public parameters PK 108, the ciphertext CT 124, which contains an access structure/policy A 122, and a private key SK 116. If the set of attributes S 114 satisfies the access structure/policy A 122, then the algorithm will decrypt the ciphertext CT 124 and return message M 120.

Figure 2:
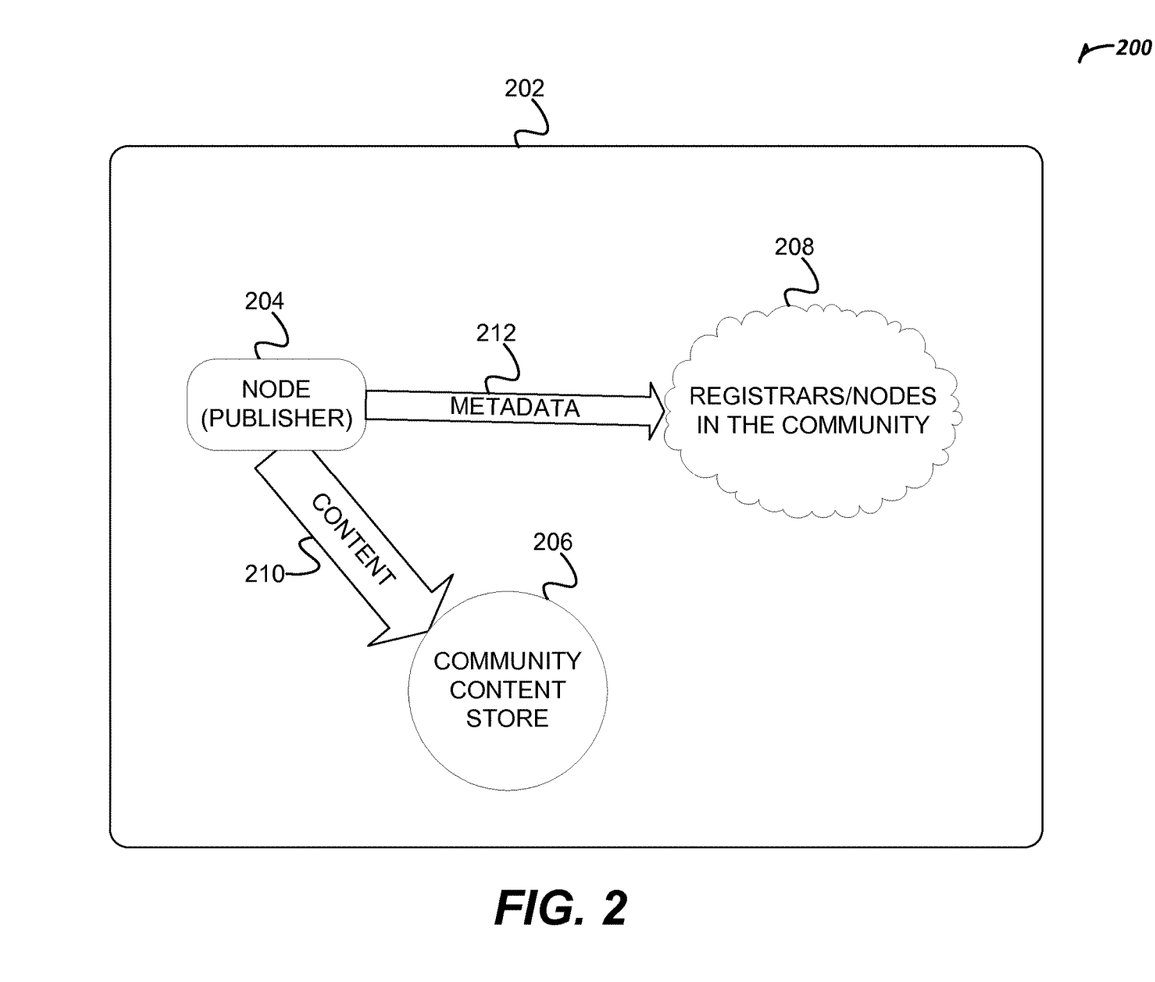
FIG. 2 illustrates a process of a node publishing content within a content-based network, in accordance with some embodiments.

FIG. 2 illustrates a process 200 of a node 204 publishing content 210 within a content-based network 202, in accordance with some embodiments. In some embodiments, a publish operation within a content-based network 202 results in the publisher 204 pushing two messages 210, 212 into the content-based network 202. First, the published content 210 is stored in the content-based network 202 according to the algorithms found in the distribution system 206.

Second, the metadata 212 associated with the content 210, which allows the content 210 to be discoverable with standard user queries, is pushed to a plurality of registrars and/or nodes 208 in the content-based network 202. A registrar 208 is an entity that is responsible for indexing metadata. In some embodiments, the metadata 212 is published directly to nodes 208, to registrars 208, or some combination thereof. In some embodiments, when metadata 212 arrives at individual nodes 208, each node 208 ingests this metadata 212 into a structured, queryable form, such as an RDF (Resource Description Framework) graph, and inserts it into the node's registrar 208. Users can then query over this graph to obtain specific IDs that match the query, which can subsequently be fetched from the content-based network 202. This aggressive approach pays the resource penalty upfront to provide nodes 208 with low-latency, delay-tolerant content searching capabilities, which is particularly important in volatile MANETs (mobile ad-hoc networks).

In some embodiments, all nodes 208 in the content-based network 202 store all information needed to satisfy queries (e.g., the node 208 is its own registrar 208). In such embodiments, a query issued by a node 208 is translated into a set of specific content requests on the local node 208 itself. A user query issued at the user's node 208 can be fulfilled locally by the user's node 208, thus increasing communications security.

In some embodiments, each node 208 is associated with at least one registrar 208. In some embodiments, each registrar 208 is associated with at least one node 208. In some embodiments, a registrar 208 is a database or a plurality of cooperating databases.

In some embodiments, a content-based network 202 dynamically detects stable regions of the network, and pools the resources within those regions together to store, distribute, and serve content efficiently. These regions, referred to as "communities," may be thought of as "storage clouds" that automatically and efficiently organize all relevant content that they encounter using a storage scheme, such as a community Distributed Hash Table (DHT). In some embodiments, a content-based network 202 prioritizes resource utilization by considering content metadata and community context (e.g., mission, role, location) to influence how content is moved and stored within and among communities. Applications search for content using rich semantic queries that are resolved to a set of unique Content Identifiers (CIDs) by a local Content Naming Subsystem (CNS).

Figure 3:
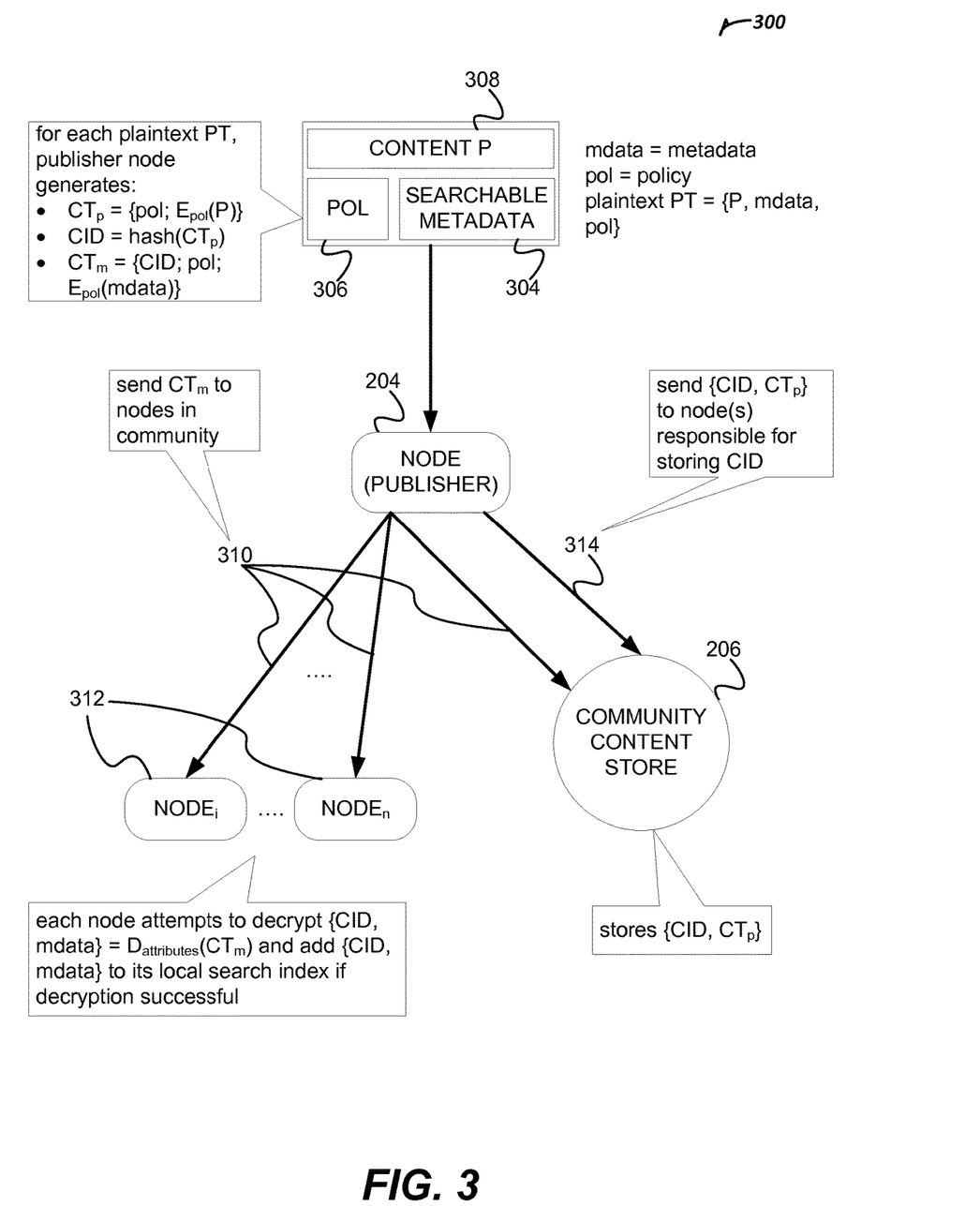
FIG. 3 illustrates a publishing process for publishing content that is secured with policy-based access control within a content-based network, in accordance with some embodiments.

FIG. 3 illustrates a publishing process 300 for publishing content that is secured with policy-based access control within a content-based network 202, in accordance with some embodiments. In some embodiments, publisher node 204 wishes to publish content P 308 along with a set of searchable metadata ("mdata") 304 that describes content P 308. The publisher node 204 wishes to control who can access the plaintext PT={P 308; mdata 304} using an access policy POL 306 defined over the universe of access control attributes.

The publisher node 204 encrypts the content P 308 with POL 306 to create encrypted content $E_{POL}(P)$. The publisher node 204 then combines the encrypted content $E_{POL}(P)$ with POL 306 to create content ciphertext $CT_P$. The publisher node 204 then computes a hash of $CT_P$ to create content identifier CID.

The publisher node 204 also encrypts the searchable metadata 304 to create encrypted metadata $E_{POL}$(mdata). The publisher node 204 then combines the encrypted metadata $E_{POL}$(mdata) with the CID and POL 306 to create metadata ciphertext $CT_M$. The content identifier CID is included in the metadata ciphertext to allow the metadata ciphertext to reference the content, with which the metadata is associated.

The publisher node 204 sends 314 the content identifier CID and the content ciphertext $CT_P$ to the node(s) 206 responsible for storing the content. The node(s) 206 responsible for storing the content receives and indexes the content ciphertext $CT_P$ using content identifier CID.

The publisher node 204 disseminates 310 the metadata ciphertext $CT_M$ to a plurality of nodes 312 in the community, including the node(s) 206 responsible for storing the content. In some embodiments, the publisher node 204 disseminates 310 the metadata ciphertext $CT_M$ to all nodes 312 in the community.

Each node 312 that receives metadata ciphertext $CT_M$ attempts to decrypt $CT_M$ for indexing purposes. A node 312 is able to successfully decrypt only if the node 312 possess the attributes (and corresponding private key) that satisfies encryption policy POL 306. Upon successful decryption, the node 312 passes the metadata to the CNS so that the content is searchable. The node 312 additionally stores $CT_M$.

Retagging is the process of adding metadata to a content item by a node, possibly different from the original publisher node 204 of the content item. For example, a node 204 fetches a content item, decrypts the plaintext that was encrypted under policy POL 306, decides to further annotate the content item with a new set of metadata fields, and publishes the new set of metadata fields under a new policy $POL_i$. This process is similar to publishing process 300 except the retagging process involves only metadata.

Figure 4:
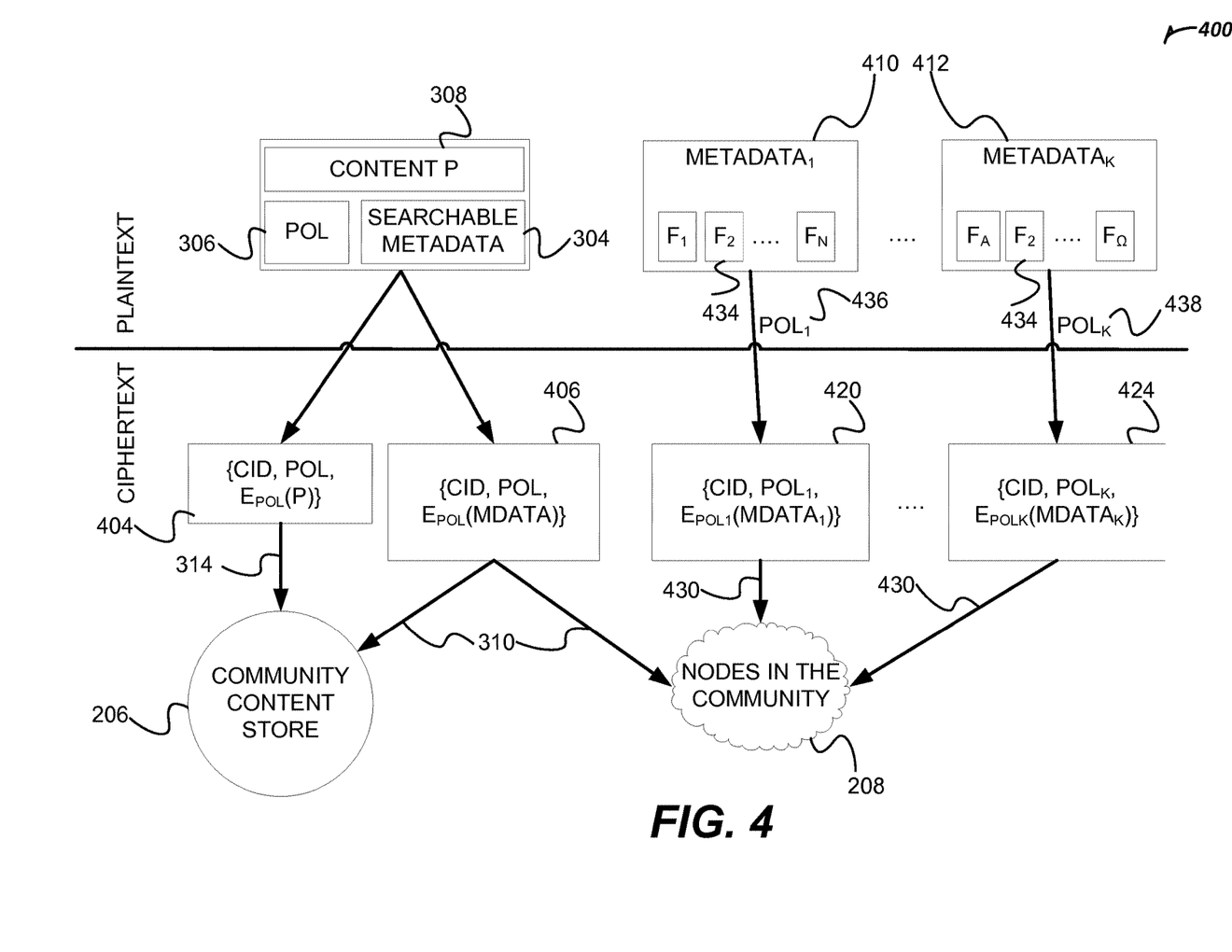
FIG. 4 illustrates a process for securing various metadata fields with different access control policies within a content-based network, in accordance with some embodiments.

FIG. 4 illustrates a process 400 for securing various metadata fields with different access control policies within a content-based network, in accordance with some embodiments. As illustrated in FIG. 3, $CT_P=\{POL, E_{POL}(P)\}$ and $CT_m=\{CID; POL; E_{POL}(MDATA)\}$. As further illustrated in FIG. 3, a publisher node 204 combines content identifier CID and the content ciphertext $CT_P$ and sends 314 this combination 404 to the node(s) 206 responsible for storing the content. The publisher node 204 also disseminates 310 the metadata ciphertext $CT_M$ 406 to a plurality of nodes 208 in the community, including the node(s) 206 responsible for storing the content. In some embodiments, the publisher node 204 disseminates 310 the metadata ciphertext $CT_M$ 406 to all nodes in the community.

In some embodiments, various metadata fields within searchable metadata 304 are grouped into one or more metadata subsets and encrypted under different polices. This allows metadata subsets to have different levels of security from the searchable metadata 304. For example, FIG. 4 illustrates the metadata fields of searchable metadata 304 grouped into K subsets, from subset $METADATA_1$ 410 to $METADATA_K$ 412. In some embodiments, each metadata subset j is encrypted with a policy $POL_j$. FIG. 4 illustrates $METADATA_1$ 410 encrypted with policy $POL_1$ 436 and $METADATA_K$ 412 encrypted with policy $POL_K$ 438.

As with searchable metadata 304, upon $MDATA_j$ being encrypted with policy $POL_j$, the encrypted metadata $E_{POLj}(MDATA_j)$ is combined with the CID and $POL_j$ to create $CT_{Mj}=\{CID, POL_j, E_{POLj}(MDATA_j)\}$. For example, FIG. 4 illustrates $CT_{M1}=\{CID, POL_1, E_{POL1}(MDATA_1)\}$ 420 and $CT_{MK}=\{CID, POL_K, E_{POLK}(MDATA_K)\}$ 424. $CT_{Mj}$ is then published 430 to a plurality of nodes in the community 208. In some embodiments, $CT_{Mj}$ is published 430 to all nodes in the community 208.

In general, for efficiency, it is recommended that $POL_j$ be at least more restrictive than policy POL 306 (the policy that was used to encrypt the original content item) so that a node that incurs the cost of decrypting $POL_j$-encrypted metadata ciphertext would be able to decrypt the referenced content item. Otherwise, the decryption of $POL_j$-encrypted metadata ciphertext would be wasteful.

In some embodiments, a metadata field exists in more than one subset. For example, FIG. 4 shows metadata field $F_2$ 434 as being in subset $METADATA_1$ 410 and $METADATA_K$ 412. In some embodiments, a metadata subset has only one metadata field.

Figure 5:
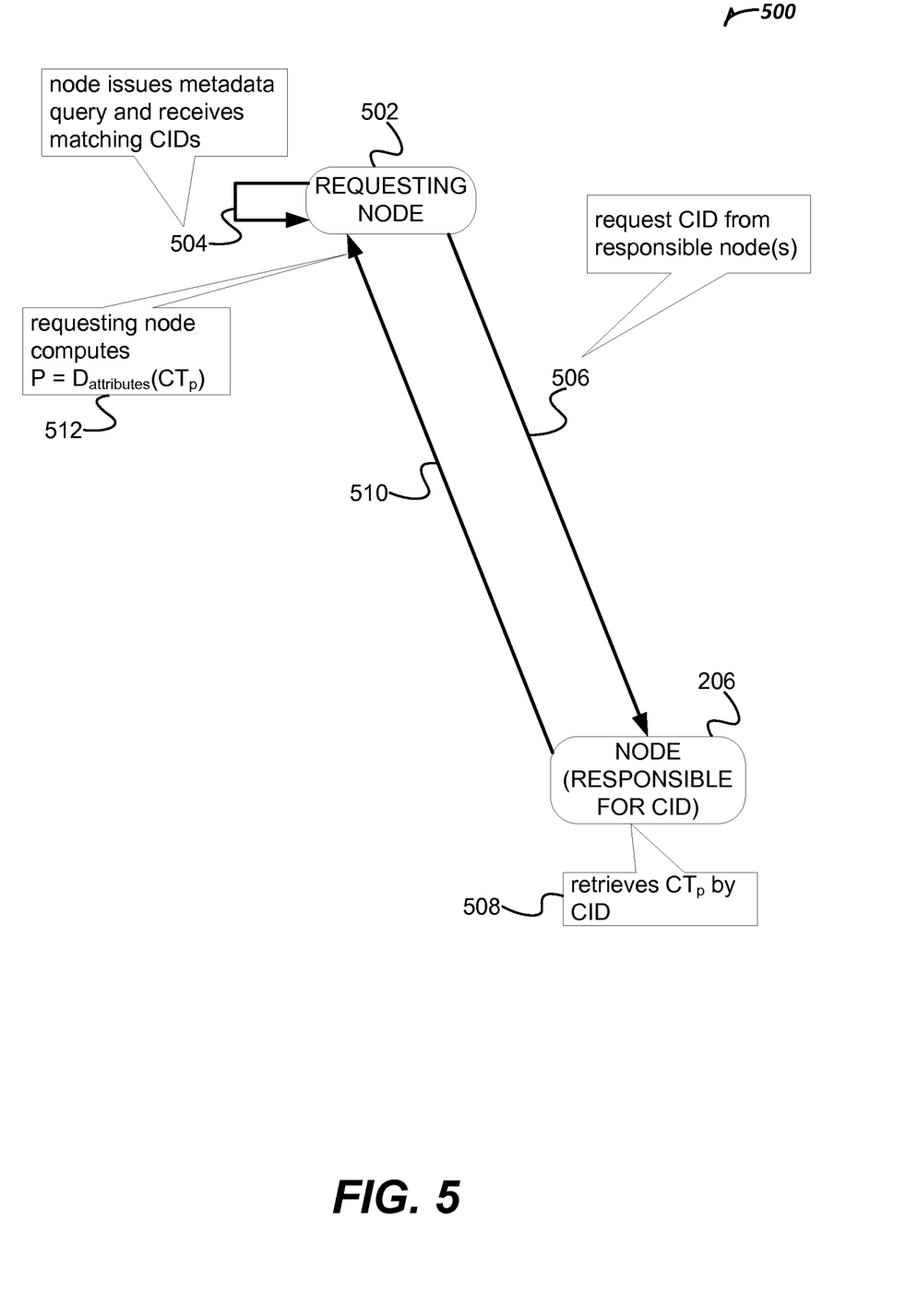
FIG. 5 illustrates a querying process for finding and retrieving content that is secured with policy-based access control within a content-based network, in accordance with some embodiments.

FIG. 5 illustrates a querying process 500 for finding and retrieving content that is secured with policy-based access control within a content-based network, in accordance with some embodiments. In some embodiments, requesting node 502 issues a metadata query 504 to its registrar. In some embodiments, where the registrar of the requesting node 502 is local to the requesting node 502, the metadata query 504 is likewise local. If the registrar has one or more CIDs associated with the metadata query 504, the registrar returns the one or more CIDs to the requesting node 502.

If one or more CIDs are returned from metadata query 504, the requesting node 502 issues a request 506 for one, some, or all of the CIDs returned from metadata query 504. In some embodiments, the request 506 is sent to the node(s) 206 responsible for storing the content indexed by the CID(s). In some embodiments, a node 206 responsible for storing the CID(s) includes the requesting node 502.

Upon receiving the request 506, node 206 retrieves 508 the respective $CT_P$ associated with each respective CID in the request 506. Upon successfully retrieving 508 a $CT_P$, node 206 sends 510 the $CT_P$ to the requesting node 502. In some embodiments, where more than one CID is requested by requesting node 502, node 206 sends 510 a $CT_P$ to requesting node 502 without aggregating the $CT_P$ with other $CT_P$s. In some embodiments, where more than one CID is requested by requesting node 502, node 206 aggregates CTps and sends 510 the aggregate requesting node 502.

Upon receiving a $CT_P$, requesting node 502 attempts to decrypt 512 the $CT_P$ using the private key of requesting node 502. If the attributes of requesting node 502 satisfy the policy POL 306 used to encrypt content P 308 into $CT_P$, requesting node 502 will successfully decrypt 512 $CT_P$ to obtain content P 308.

Figure 6:
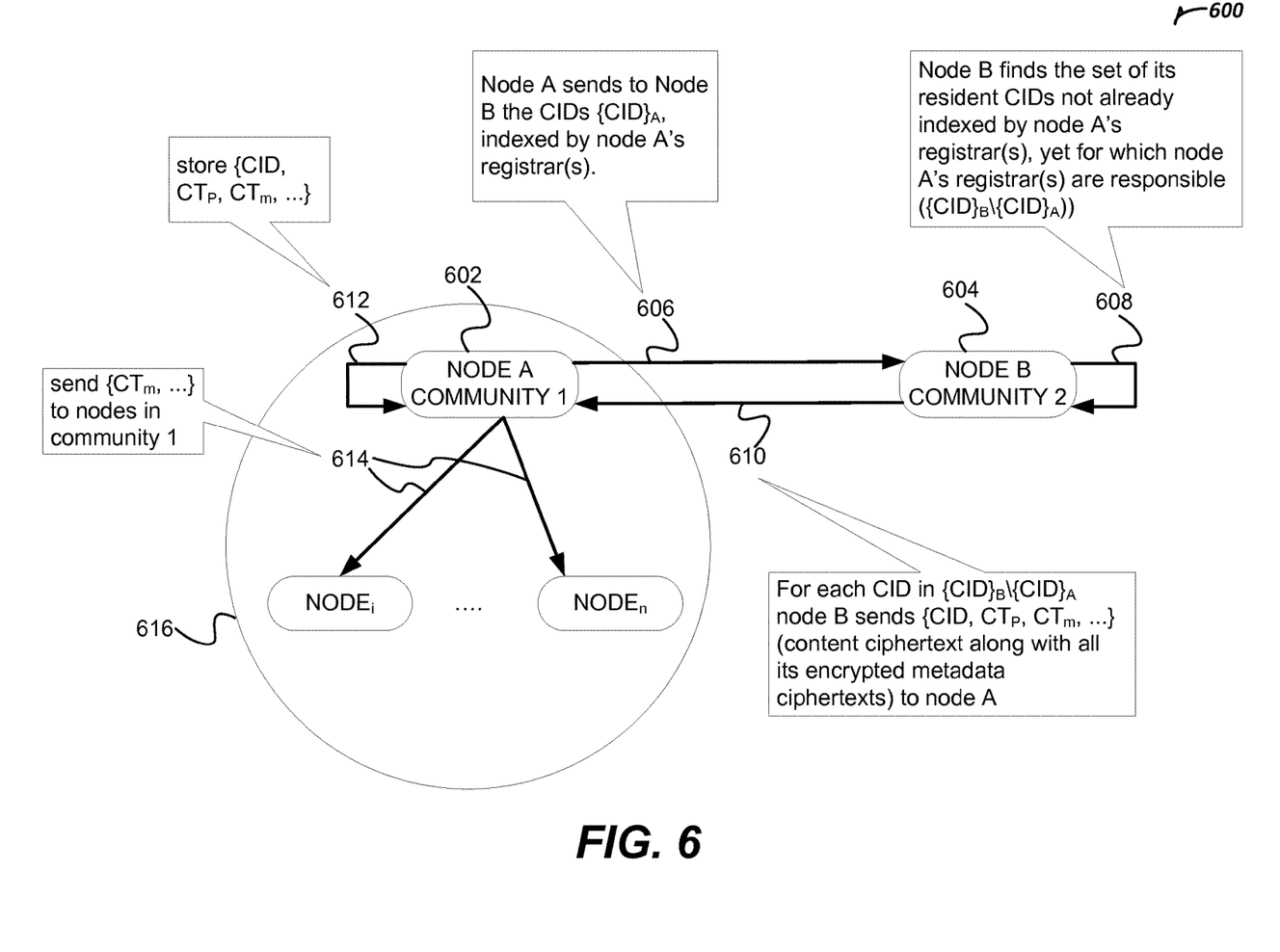
FIG. 6 illustrates a synchronizing process for synchronizing items between nodes belonging to different communities within a content-based network, in accordance with some embodiments.

FIG. 6 illustrates a synchronizing process 600 for synchronizing items between nodes belonging to different communities within a content-based network, in accordance with some embodiments. In some embodiments, two nodes from different communities within a content-based network wish to synchronize their items to make them available for other nodes in their respective communities. In some embodiments, a synchronization process 600 begins after two nodes from different communities become within range of each other.

For example, node A 602 in community 1 616 wants to obtain the items available to node B 604 in community 2 (not shown). Node A 602 sends 606 to node B 604 its resident CIDs $\{CID\}_A$ (e.g., the CIDs indexed by the registrar(s) of node A 602) and a compact representation of the content, for which node A's 602 registrar(s) is/are responsible. In some embodiments using a DHT, node A 602 sends 606 to node B 604 the resident CIDs $\{CID\}_A$ within its registrar's/registrars' range of the DHT ring, along with its registrar's/registrars' DHT range.

Node B 604 then finds 608 the set of its resident CIDs not already indexed by node A's 602 registrar(s), yet for which node A's 602 registrar(s) are responsible ($\{CID\}_B \backslash \{CID\}_A$)). For each CID in $\{CID\}_B \backslash \{CID\}_A$, node B 604 sends 610 $\{CID, CT_P, CT_M, \ldots\}$ (e.g., CID, content ciphertext, and all encrypted metadata ciphertexts associated with the content ciphertext) to node A 602.

Upon receiving a $\{CID, CT_P, CT_M, \ldots\}$, node A 602 stores 612 $\{CID, CT_P, CT_M, \ldots\}$ to its registrar(s). Finally, node A 602 sends 614 $\{CT_M, \ldots\}$ (e.g., all encrypted metadata ciphertexts associated with the content ciphertext) to a plurality of nodes in community 1 616. In some embodiments, node A 602 sends 614 $\{CT_M, \ldots\}$ to all nodes in community 1 616.

Figure 7:
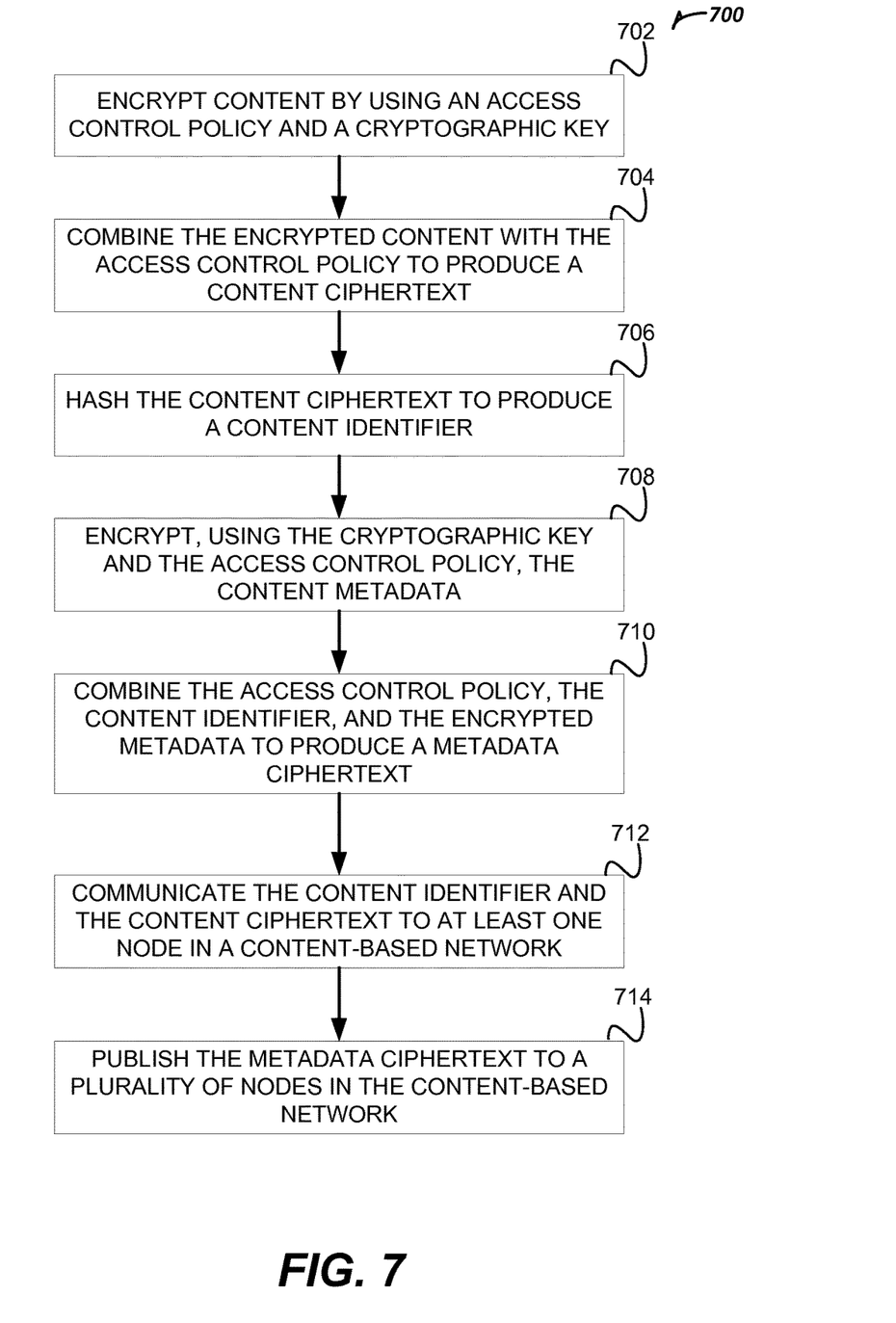
FIG. 7 is a block diagram of a method for securing metadata and content using policy-based access control within a content-based network, in accordance with some embodiments.

FIG. 7 is a block diagram of a method 700 for securing metadata and content using policy-based access control within a content-based network, in accordance with some embodiments.

At operation 702, content is encrypted using an access control policy and a cryptographic key.

At operation 704, the encrypted content and the access control policy are combined to produce a content ciphertext.

At operation 706, the content ciphertext is hashed to produce a content identifier.

At operation 708, the content metadata is encrypted using the cryptographic key and the access control policy.

At operation 710, the access control policy, the content identifier, and the encrypted metadata are combined to produce a metadata ciphertext.

At operation 712, the content identifier and the content ciphertext are communicated to at least one node in a content-based network.

At operation 714, the metadata ciphertext is published to a plurality of nodes in the content-based network.

Figure 8:
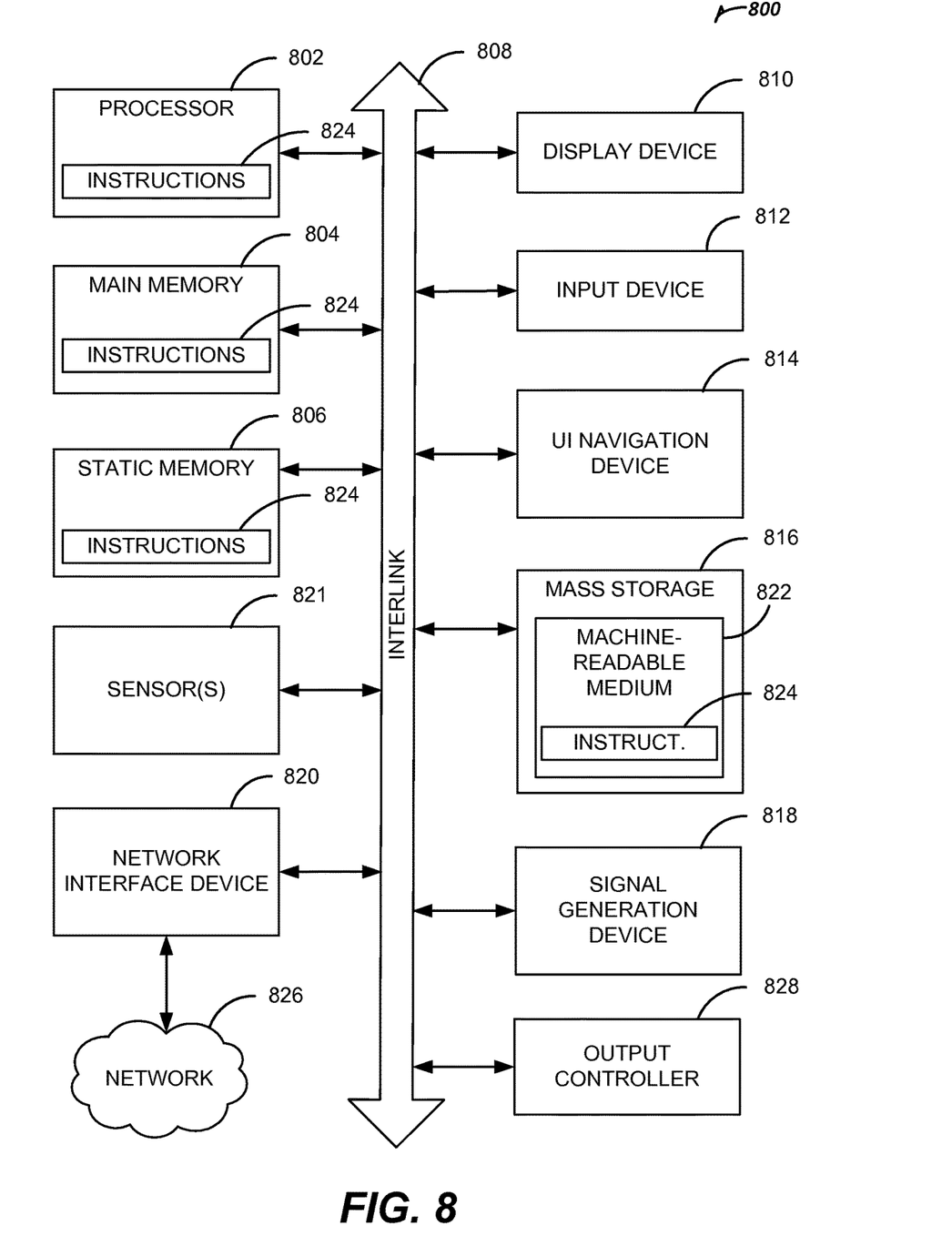
FIG. 8 is a block diagram illustrating an example of a machine, upon which one or more embodiments may be implemented.

FIG. 8 is a block diagram illustrating an example of a machine 800, upon which one or more embodiments may be implemented. In some embodiments, the machine 800 operates as a standalone device or is connected (e.g., networked) to other machines. In a networked deployment, the machine 800 operates in the capacity of a server machine, a client machine, or both in server-client network environments. In an example, the machine 800 acts as a peer machine in peer-to-peer (P2P) (or other distributed) network environment. In some embodiments, the machine 800 is a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, although only a single machine 800 is illustrated, the term "machine" shall also be taken to include any collection of machines 800 that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. In some embodiments, the hardware is specifically configured (e.g., hardwired) to perform a specific operation. In some embodiments, the hardware includes configurable execution units (e.g., transistors, circuits, etc.) and a machine-readable medium 822 containing instructions 824, where the instructions 824 configure the execution units to perform a specific operation when in operation. In some embodiments, the configuring occurs under the direction of the executions units or a loading mechanism. Accordingly, the execution units are communicatively coupled to the machine-readable medium 822 when the device is operating. In some embodiments, the execution units are members of more than one module. In some embodiments, under operation, the execution units are configured by a first set of instructions to implement a first module at one point in time and reconfigured by a second set of instructions to implement a second module at another point in time.

In some embodiments, machine (e.g., computer system) 800 includes a hardware processor 802 (e.g., a central processing unit (CPU), a graphics processing unit (GPU), a hardware processor core, or any combination thereof), a main memory 804 and/or a static memory 806, some or all of which communicate with each other via an interlink (e.g., bus) 808. In some embodiments, the machine 800 further includes a display unit 810, an alphanumeric input device 812 (e.g., a keyboard), and a user interface (UI) navigation device 814 (e.g., a mouse). In some embodiments, the display unit 810, input device 812 and UI navigation device 814 are one or more touch screen displays. In some embodiments, the machine 800 additionally includes a storage device (e.g., drive unit) 816, a signal generation device 818 (e.g., a speaker), a network interface device 820, and one or more sensors 821, such as a global positioning system (GPS) sensor, compass, accelerometer, or other sensor. In some embodiments, the machine 800 includes an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

In some embodiments, the storage device 816 includes a machine-readable medium 822, on which is stored one or more sets of data structures or instructions 824 (e.g., software) embodying or utilized by any one or more of the techniques or functions described herein. In some embodiments, the instructions 824 also reside, completely or at least partially, within the main memory 804, within static memory 806, or within the hardware processor 802 during execution thereof by the machine 800. In some embodiments, one or any combination of the hardware processor 802, the main memory 804, the static memory 806, or the storage device 816 constitute machine-readable media 822.

Although the machine-readable medium 822 is illustrated as a single medium, in some embodiments the term "machine-readable medium" include a single medium or multiple media (e.g., a centralized or distributed database, and/or associated caches and servers) configured to store the one or more instructions 824.

In some embodiments, the term "machine-readable medium" includes any medium 822 that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium 822 examples include solid-state memories, optical media, and magnetic media. In some embodiments, a massed machine-readable medium 822 comprises a machine-readable medium 822 with a plurality of particles having resting mass. Specific examples of massed machine-readable media 822 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In some embodiments, the instructions 824 are transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In some embodiments, the network interface device 820 includes one or more physical jacks (e.g., Ethernet, coaxial, or phone jacks) or one or more antennas to connect to the communications network 826. In some embodiments, the network interface device 820 includes a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800, and includes digital or analog communications signals or other intangible medium to facilitate communication of such software.

ADDITIONAL EXAMPLES

Example 1. A method for controlling, within a content-based network comprising a plurality of nodes, access to content and metadata describing the content, the method comprising: encrypting the content by using an access control policy and a cryptographic key associated with the access control policy, the access control policy defined with a set of access control attributes; combining the encrypted content with the access control policy to produce a content ciphertext; hashing the content ciphertext to produce a content identifier; encrypting the metadata describing the content, the encrypting using the cryptographic key and the access control policy; combining the access control policy, the content identifier, and the encrypted metadata to produce a metadata ciphertext; communicating the content identifier and the content ciphertext to at least one node in the content-based network; and publishing the metadata ciphertext to a plurality of nodes in the content-based network.

In Example 2, the subject matter of Example 1 may optionally include, wherein each respective node in the content-based network is assigned a respective set of access control attributes and a respective cryptographic key generated as a function of the assigned respective set of access control attributes; and wherein each respective node in the content-based network is configured to successfully decrypt, with the respective cryptographic key of the respective node, the metadata ciphertext or the content ciphertext if and only if the assigned respective set of access control attributes of the respective node satisfies the access control policy used to encrypt the metadata ciphertext or content ciphertext.

In Example 3, the subject matter of any of Examples 1-2 may optionally include, wherein the respective set of access control attributes and the respective cryptographic key are assigned to each respective node by a trusted third party.

In Example 4, the subject matter of any of Examples 1-3 may optionally include, wherein the at least one node is responsible for storing the content identifier and indexing the content ciphertext using the content identifier.

In Example 5, the subject matter of any of Examples 1-4 may optionally include, wherein the access control policy uses Boolean operators over the access control attributes in the set of access control attributes.

In Example 6, the subject matter of any of Examples 1-5 may optionally include, wherein the metadata describing the content is comprised of metadata fields, and wherein respective sets of metadata fields are configured to be encrypted using respective access control policies.

In Example 7, the subject matter of any of Examples 1-6 may optionally include, wherein the metadata is communicated to a registrar associated with a respective node upon the metadata ciphertext being successfully decrypted by the respective node.

In Example 8, the subject matter of any of Examples 1-7 may optionally include, or may optionally be combined with, subject matter including a system for controlling, within a content-based network comprising a plurality of nodes, access to content and metadata describing the content, the system comprising: a trusted third party; and a plurality of nodes, each node in the plurality comprising: an encryption module arranged to encrypt the content by using an access control policy and a cryptographic key associated with the access control policy, the access control policy defined with a set of access control attributes; a combining module arranged to combine the encrypted content with the access control policy to produce a content ciphertext; a hashing module arranged to calculate a hash of the content ciphertext to produce a content identifier; the encryption module further arranged to encrypt the metadata describing the content, the encrypting using the cryptographic key and the access control policy; the combining module further arranged to combine the access control policy, the content identifier, and the encrypted metadata to produce a metadata ciphertext; a communications module arranged to communicate the content identifier and the content ciphertext to at least one node in the content-based network, and further arranged to publish the metadata ciphertext to a plurality of nodes in the content-based network.

In Example 9, the subject matter of Example 8 may optionally include, wherein each respective node in the content-based network is assigned a respective set of access control attributes and a respective cryptographic key generated as a function of the assigned respective set of access control attributes; and wherein each respective node in the content-based network is configured to successfully decrypt, with the respective cryptographic key of the respective node, the metadata ciphertext or the content ciphertext if and only if the assigned respective set of access control attributes of the respective node satisfies the access control policy used to encrypt the metadata ciphertext or content ciphertext.

In Example 10, the subject matter of any of Examples 8-9 may optionally include, wherein the respective set of access control attributes and the respective cryptographic key are assigned to each respective node by the trusted third party.

In Example 11, the subject matter of any of Examples 8-10 may optionally include, wherein the at least one node is responsible for storing the content identifier and indexing the content ciphertext using the content identifier.

In Example 12, the subject matter of any of Examples 8-11 may optionally include, wherein the access control policy uses Boolean operators over the access control attributes in the set of access control attributes.

In Example 13, the subject matter of any of Examples 8-12 may optionally include, wherein the metadata describing the content is comprised of metadata fields, and wherein respective sets of metadata fields are configured to be encrypted using respective access control policies.

In Example 14, the subject matter of any of Examples 8-13 may optionally include, wherein each node is associated with at least one registrar, and wherein the metadata is communicated to the at least one registrar associated with a respective node upon the metadata ciphertext being successfully decrypted by the respective node.

In Example 15, the subject matter of any of Examples 1-14 may optionally include, or may optionally be combined with, subject matter including a non-transitory, machine-readable medium comprising instructions that, when executed by the machine, cause the machine to perform operations for controlling, within a content-based network comprising a plurality of nodes, access to content and metadata describing the content, the operations comprising: encrypting the content by using an access control policy and a cryptographic key associated with the access control policy, the access control policy defined with a set of access control attributes; combining the encrypted content with the access control policy to produce a content ciphertext; hashing the content ciphertext to produce a content identifier; encrypting the metadata describing the content, the encrypting using the cryptographic key and the access control policy; combining the access control policy, the content identifier, and the encrypted metadata to produce a metadata ciphertext; communicating the content identifier and the content ciphertext to at least one node in the content-based network; and publishing the metadata ciphertext to a plurality of nodes in the content-based network.

In Example 16, the subject matter of Example 15 may optionally include, wherein each respective node in the content-based network is assigned a respective set of access control attributes and a respective cryptographic key generated as a function of the assigned respective set of access control attributes; and wherein each respective node in the content-based network is configured to successfully decrypt, with the respective cryptographic key of the respective node, the metadata ciphertext or the content ciphertext if and only if the assigned respective set of access control attributes of the respective node satisfies the access control policy used to encrypt the metadata ciphertext or content ciphertext.

In Example 17, the subject matter of any of Examples 15-16 may optionally include, wherein the respective set of access control attributes and the respective cryptographic key are assigned to each respective node by the trusted third party.

In Example 18, the subject matter of any of Examples 15-17 may optionally include, wherein the at least one node is responsible for storing the content identifier and indexing the content ciphertext using the content identifier.

In Example 19, the subject matter of any of Examples 15-18 may optionally include, wherein the access control policy uses Boolean operators over the access control attributes in the set of access control attributes.

In Example 20, the subject matter of any of Examples 15-19 may optionally include, wherein the metadata describing the content is comprised of metadata fields; and wherein respective sets of metadata fields are configured to be encrypted using respective access control policies.

In Example 21, the subject matter of any of Examples 15-20 may optionally include, wherein the metadata is communicated to a registrar associated with a respective node upon the metadata ciphertext being successfully decrypted by the respective node.

Conventional terms in the fields of cryptography and computer networking have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above Detailed Description includes references to the accompanying drawings, which form a part of the detailed description. The drawings show, by way of illustration, specific embodiments, in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowcharts and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block could occur out of the order noted in the figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or process described herein can be implemented in software or a combination of software and human implemented procedures. The software can consist of machine-executable instructions stored on machine-readable media, such as memory or other type of storage devices. The term "machine-readable media" is also used to represent any means, by which the machine-readable instructions can be received by the machine, such as by different forms of wired or wireless transmissions. Further, such functions correspond to modules, which are software, hardware, firmware, or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system. In this document, the terms "a" or "an" are used, as is common in patent documents, to include one or more than one, independent of any other instances or usages of "at least one" or "one or more."

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B," "103B but not 103A," and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Furthermore, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for controlling, within a content-based network comprising a plurality of nodes, access to content and metadata describing the content, the method comprising:
   encrypting the content by using an access control policy and a cryptographic key associated with the access control policy, the access control policy defined with a set of access control attributes;
   combining the encrypted content with the access control policy to produce a content ciphertext;
   hashing the content ciphertext to produce a content identifier;
   encrypting the metadata describing the content, the encrypting using the cryptographic key and the access control policy;
   combining the access control policy, the content identifier, and the encrypted metadata to produce a metadata ciphertext;
   communicating the content identifier and the content ciphertext to at least one node in the content-based network; and
   publishing the metadata ciphertext to a plurality of nodes in the content-based network,
   wherein:
      each respective node in the content-based network is assigned a respective set of access control attributes and a respective cryptographic key generated as a function of the assigned respective set of access control attributes; and
      each respective node in the content-based network is configured to successfully decrypt, with the respective cryptographic key of the respective node, the metadata ciphertext or the content ciphertext if and only if the assigned respective set of access control attributes of the respective node satisfies the access control policy used to encrypt the metadata ciphertext or content ciphertext.

2. The method of claim 1, wherein the respective set of access control attributes and the respective cryptographic key are assigned to each respective node by a trusted third party.

3. The method of claim 1, wherein the at least one node is responsible for storing the content identifier and indexing the content ciphertext using the content identifier.

4. The method of claim 1, wherein the access control policy uses Boolean operators over the access control attributes in the set of access control attributes.

5. The method of claim 1, wherein the metadata describing the content is comprised of metadata fields, and wherein respective sets of metadata fields are configured to be encrypted using respective access control policies.

6. The method of claim 1, wherein the metadata is communicated to a registrar associated with a respective node upon the metadata ciphertext being successfully decrypted by the respective node.

7. A system for controlling, within a content-based network comprising a plurality of nodes, access to content and metadata describing the content, the system comprising:
   a trusted third party; and
   a plurality of nodes, each node in the plurality comprising:
      an encryption module arranged to encrypt the content by using an access control policy and a cryptographic key associated with the access control policy, the access control policy defined with a set of access control attributes;
      a combining module arranged to combine the encrypted content with the access control policy to produce a content ciphertext;
      a hashing module arranged to calculate a hash of the content ciphertext to produce a content identifier;
      the encryption module further arranged to encrypt the metadata describing the content, the encrypting using the cryptographic key and the access control policy;
      the combining module further arranged to combine the access control policy, the content identifier, and the encrypted metadata to produce a metadata ciphertext;
      a communications module arranged to communicate the content identifier and the content ciphertext to at least one node in the content-based network, and further arranged to publish the metadata ciphertext to a plurality of nodes in the content-based network,
   wherein:
      each respective node in the content-based network is assigned a respective set of access control attributes and a respective cryptographic key generated as a function of the assigned respective set of access control attributes; and
      each respective node in the content-based network is configured to successfully decrypt, with the respective cryptographic key of the respective node, the metadata ciphertext or the content ciphertext if and only if the assigned respective set of access control attributes of the respective node satisfies the access control policy used to encrypt the metadata ciphertext or content ciphertext.

8. The system of claim 7, wherein the respective set of access control attributes and the respective cryptographic key are assigned to each respective node by the trusted third party.

9. The system of claim 7, wherein the at least one node is responsible for storing the content identifier and indexing the content ciphertext using the content identifier.

10. The system of claim 7, wherein the access control policy uses Boolean operators over the access control attributes in the set of access control attributes.

11. The system of claim 7, wherein the metadata describing the content is comprised of metadata fields, and wherein respective sets of metadata fields are configured to be encrypted using respective access control policies.

12. The system of claim 7, wherein each node is associated with at least one registrar, and wherein the metadata is communicated to the at least one registrar associated with a respective node upon the metadata ciphertext being successfully decrypted by the respective node.

13. A non-transitory, machine-readable medium comprising instructions that, when executed by the machine, cause the machine to perform operations for controlling, within a content-based network comprising a plurality of nodes, access to content and metadata describing the content, the operations comprising:
   encrypting the content by using an access control policy and a cryptographic key associated with the access control policy, the access control policy defined with a set of access control attributes;
   combining the encrypted content with the access control policy to produce a content ciphertext;
   hashing the content ciphertext to produce a content identifier;
   encrypting the metadata describing the content, the encrypting using the cryptographic key and the access control policy;
   combining the access control policy, the content identifier, and the encrypted metadata to produce a metadata ciphertext;
   communicating the content identifier and the content ciphertext to at least one node in the content-based network; and
   publishing the metadata ciphertext to a plurality of nodes in the content-based network,
   wherein:
      each respective node in the content-based network is assigned a respective set of access control attributes and a respective cryptographic key generated as a function of the assigned respective set of access control attributes; and
      each respective node in the content-based network is configured to successfully decrypt, with the respective cryptographic key of the respective node, the metadata ciphertext or the content ciphertext if and only if the assigned respective set of access control attributes of the respective node satisfies the access control policy used to encrypt the metadata ciphertext or content ciphertext.

14. The non-transitory, machine-readable medium of claim 13, wherein the respective set of access control attributes and the respective cryptographic key are assigned to each respective node by the trusted third party.

15. The non-transitory, machine-readable medium of claim 13, wherein the at least one node is responsible for storing the content identifier and indexing the content ciphertext using the content identifier.

16. The non-transitory, machine-readable medium of claim 13, wherein the access control policy uses Boolean operators over the access control attributes in the set of access control attributes.

17. The non-transitory, machine-readable medium of claim 13, wherein the metadata describing the content is comprised of metadata fields; and wherein respective sets of metadata fields are configured to be encrypted using respective access control policies.

18. The non-transitory, machine-readable medium of claim 13, wherein the metadata is communicated to a registrar associated with a respective node upon the metadata ciphertext being successfully decrypted by the respective node.

\* \* \* \* \*

UNITED STATES PATENT AND TRADEMARK OFFICE
CERTIFICATE OF CORRECTION

PATENT NO. : 9,571,463 B2
APPLICATION NO. : 14/330543
DATED : February 14, 2017
INVENTOR(S) : Strayer et al.

It is certified that error appears in the above-identified patent and that said Letters Patent is hereby corrected as shown below:

On the Title Page

On page 2, in Column 2, item (56), under "Other Publications", Line 20, delete "Crytography," and insert --Cryptography,-- therefor In the Specification In Column 7, Line 19, delete "CTps" and insert --$CT_P s$-- therefor Signed and Sealed this
Twenty-fourth Day of July, 2018

Andrei Iancu
*Director of the United States Patent and Trademark Office*